United States Patent [19]

Hawk et al.

[11] Patent Number: 5,133,664

[45] Date of Patent: Jul. 28, 1992

[54] MANUAL BRAILLE WRITER

[75] Inventors: Lawrence S. Hawk, Lenior City; Joe H. Turner, Knoxville, both of Tenn.

[73] Assignee: Martin Marietta Energy Systems, Inc., Oak Ridge, Tenn.

[21] Appl. No.: 628,306

[22] Filed: Dec. 14, 1990

[51] Int. Cl.⁵ ............................................. G09B 21/02
[52] U.S. Cl. ................................................. 434/115
[58] Field of Search ............... 434/112, 113, 114, 115; 81/9.2

[56] References Cited

U.S. PATENT DOCUMENTS

| | | | |
|---|---|---|---|
| 1,175,951 | 4/1916 | Greene | 434/115 |
| 1,293,023 | 2/1919 | Bryan et al. | 434/115 X |
| 2,190,752 | 2/1940 | Brown | 434/115 |
| 2,823,468 | 2/1958 | Mora | 434/115 |
| 2,850,812 | 9/1958 | Mannheimer | 434/115 |
| 3,340,625 | 9/1967 | Supitilov | 434/115 |
| 3,750,729 | 8/1973 | Lemieux | 401/31 X |

FOREIGN PATENT DOCUMENTS

| | | | |
|---|---|---|---|
| 83902 | 12/1956 | Netherlands | 434/115 |
| 11720 | 5/1898 | United Kingdom | 434/115 |

*Primary Examiner*—Richard J. Apley
*Assistant Examiner*—Karen A. Richard

*Attorney, Agent, or Firm*—Herman L. Holsopple; Harold W. Adams

[57] ABSTRACT

A manual-type braille writer that provides for both writing and reading in a normal left-to-right manner. In the preferred form, this braille writer has a clip board type base, and in the preferred embodiment a guide plate assembly can be moved to, and releasable fixed at, selected vertical locations along this base. The guide plate assembly is provided with a plurality of character cells uniformly spaced along rows across the guide plate assembly as well as in uniformly spaced rows. This guide plate assembly has a lower portion to be placed under a sheet of paper positioned on the clip board base and an upper portion to be positioned on top of the sheet. This upper portion is hinged with respect to the lower portion. Each character cell is typically made up of six appropriately spaced pins extending up from the lower portion that are aligned with a rosette-shaped cutout in the upper portion. A stylus member is provided that has a distal end to be fitted into the cutout of the character cell so that a recess in the end thereof presses the writing paper over the pin associated with that recess to produce a braille dot at that location. When desired, the upper portion can be lifted up so that the text already written can be read or to determine the place for initiating writing when writing has been interrupted.

16 Claims, 4 Drawing Sheets

MANUAL BRAILLE WRITER

The U.S. Government has rights in this invention pursuant to Contract No. DE-AC05-84OR21400 awarded by U.S. Department of Energy Contract with Martin Marietta Energy Systems, Inc.

DESCRIPTION

1. Technical Field

This invention relates generally to devices for imprinting paper goods for the production of braille text, and more particularly to a manual braille writer that permits braille writing from left-to-right on writing stock which can then be read left-to-right.

2. Background Art

The braille writing system was developed over one hundred years ago as a means to permit blind persons to read text. The earliest version of "braille writers" utilized a template of a given configuration for placement over writing paper, and a stylus to insert through the template at given locations therein to cause dots to be formed on the underside of the paper. Basically this is the only type of manual braille writer still in use.

There are three grades of braille cells for use in these prior devices. The most common is Grade 1 wherein there are standard letters and a few words that can be constructed using a six-pin array. In Grade 2, which is considered to be a short-hand version of braille, the same cell configuration is used; however, there is a single dot preceding the symbols to indicate this shorthand. Grade 3, which is sometimes classified as a professional version, can use either a four pin array or an eight pin array. This version is occasionally used in advanced classes for braille writing.

The problem that arises due to this prior art construction is that, since the "reading" of the text is by finger touch against the dots, the writing has to be from right-to-left such that when the paper is turned over for reading it can be read left-to-right. Thus, a blind person has to learn both the writing technique and the reading technique. This has severely limited the number of blind persons who use any braille system. Another problem that has not been solved for the manual braille writer is how to properly align lines of text, or even braille characters in a line, during the writing particularly when the writing is interrupted for any reason. These problems must be even addressed by a sighted person who prepares braille-type text for the blind.

Machine-type braille writers have been developed that overcome these two problems. These devices are in the form of a typewriter where either the braille characters are formed alone or in combination with visual characters so that the text can be read by either the blind or sighted person. In some of these the problem of direction of reading has been addressed by establishing a mechanism to cause the raised dots to be on the upper surface of the paper. Thus, both the writing and reading can be accomplished left-to-right.

Typical of the mechanical devices are shown and described in U.S. Pat. Nos. 980,778 issued to J. Heater on Jan. 3, 1911; 2,454,637 issued to J. Tejedo on Nov. 23, 1948; 3,254,750 issued to E. Goldner on Jun. 7, 1966; 3,332,527 issued to R. Place on Jul. 25, 1967; 3,910,397 issued to B. Harding on Oct. 7, 1975; 4,404,764 issued to D. Wills, et al on Sep. 20, 1983; and 4,488,828 issued to N. Ohtsuki on Dec. 18, 1984.

The mechanical devices are not without problems. An important factor is the complexity and cost. This prevents their purchase by the several millions of blind persons in the undeveloped countries of the world as well as the indigent in the U.S. Further, such mechanical devices are certainly impractical for use in the classroom or similar situation where notes are to be taken, for example.

Accordingly, it is an object of the present invention to provide an inexpensive and simple braille writer that permits both left-to-right writing and reading from the same side of the writing paper.

It is another object of the present invention to provide a manual braille writer wherein there is easy address of a particular position upon the writing paper.

A further object of the present invention is to provide a manual braille writer that automatically spaces braille characters in uniform lines and columns on a writing sheet.

These and other objects of the present invention will become apparent upon a consideration of the following drawings in combination with a detailed description thereof.

DISCLOSURE OF THE INVENTION

In accordance with the present invention, and in the preferred embodiments, there is provided a tablet member in the form of a "clip board" for holding writing paper in a fixed orientation thereon. Superimposed above the clip board is a guide plate assembly having a lower portion for positioning beneath the paper and an upper portion for positioning above the paper. In the preferred form, this upper portion is hingedly attached to the guide plate assembly for ease in insertion of the writing paper. A plurality of writing cells are carried by the guide plate assembly as arranged in uniformly spaced rows of writing cells, with the rows uniformly spaced from each other. Each of these cells comprise an array of pins according to the class of braille arranged on the lower portion in a format corresponding to conventional braille character formation, together with a rosette pattern aperture in the upper portion that is aligned with the pins so as to accept a hand-held stylus to push the writing paper against the pins to thereby create raised dots at selected positions to establish the desired braille character. This cell construction configuration is similar to those of the prior art. The guide plate assembly in this preferred embodiment is movable vertically along the clip board member, with exact positions established by ball detent members or the like. The particular construction permits the manual formation of braille-type text as written from left-to-right as well as the ultimate reading of the recorded text from left-to-right.

BEST MODE FOR CARRYING OUT THE INVENTION

Figure 1:
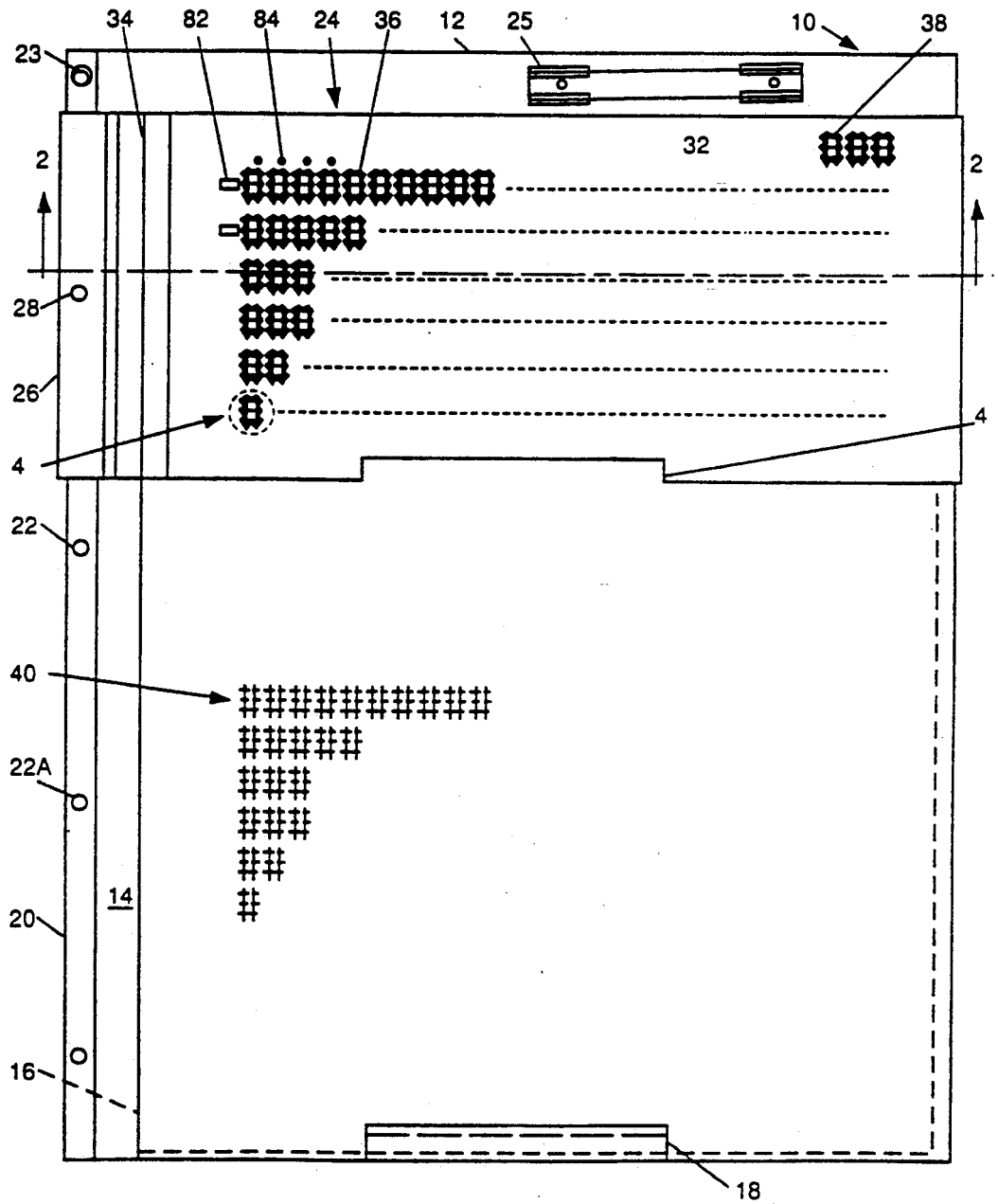
FIG. 1 is a plan view of one embodiment of the present invention including a clip board and a guide plate assembly supported thereon.
Figure 2:
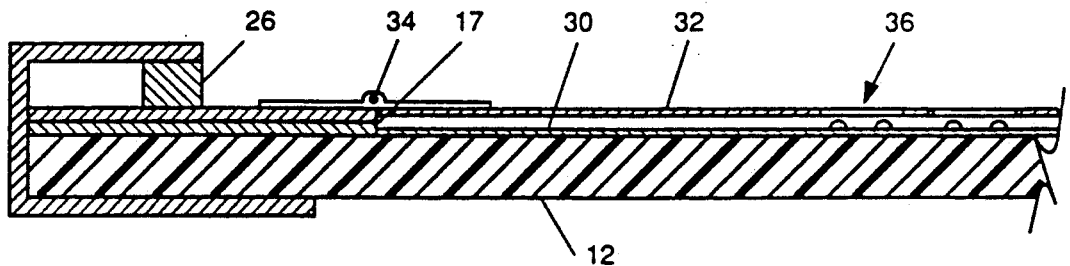
FIG. 2 is an enlarged partial cross-sectional view of the embodiment of FIG. 1 taken at 2—2 thereon showing detail of the guide plate assembly.

The present invention can be best understood by reference to FIGS. 1 and 2 where one embodiment of the invention is depicted. These figures show both a plan view of the tablet portion 10 (FIG. 1), and a partial cross-section thereof (FIG. 2). This tablet portion 10 has a "clip board" base 12 having a top surface 14 for the general support of paper (indicated by the dashed line 16) upon which braille writing is to be embossed. Any size of paper can be used, however. For convenience, there can be provided a guide 17 (see FIG. 2) to assist in the alignment of paper thereon. The clip board 12 is further provided with a conventional clip unit 18 of the type often used with conventional clip boards. For convenience this clip unit is centrally located at the bottom of the board 12; however, it could also be located at the top if desired. Along the left edge of the board 12 is attached a glide means 20 for purposes to be described below. This glide means is provided with a plurality of equally spaced position-orienting elements 22, 22A, etc., such as spherical ball detent units for purposes to be described below.

Figure 5:
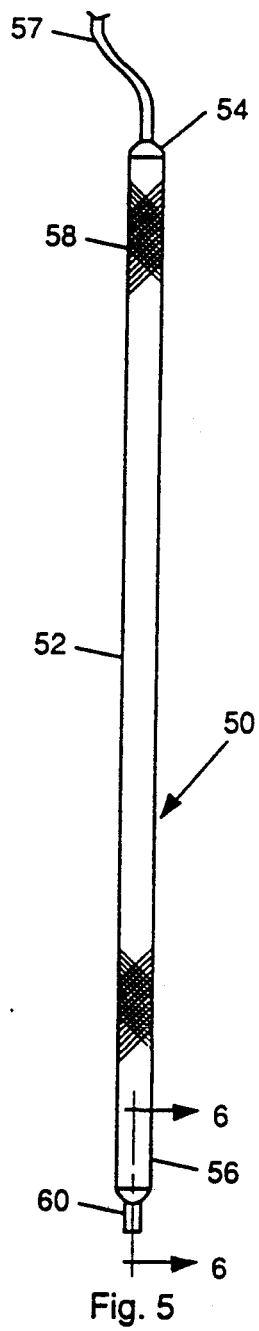
FIG. 5 is a side elevational view of a stylus for use with the assembly of FIG. 1.

It may be desirable to provide the clip board 12 with some means for attachment of a lanyard or other tether in order to attach a writing stylus of the type illustrated in FIG. 5. In the embodiment illustrated in FIG. 1, this attachment means is an eyelet 23 positioned at the upper left hand corner of the clip board 12. Of course, the lanyard can be attached at other positions on the clip board or even on the guide plate assembly. In addition, it may be desirable to provide a retaining clip 25 to hold a stylus when not in use. This retaining clip can be located at any position, and attached by any suitable means, such that it does not interfere with movement of the components or movement of the user's fingers on the braille writing unit. The clip board 12 can be fabricated from wood, a wood product, plastic or metal. The glide means typically can be plastic or metal.

Suitably engaged with the glide means 20 is a guide plate assembly 24. In this embodiment this guide plate assembly 24 has a glide means engagement 26 which is provided with at least one aperture 28 to be engaged by one of the position-orienting elements 22. This engagement assures a specific location of the guide plate assembly on the board 12. The guide plate assembly 24 has two levels: a lower portion 30 (see FIG. 2) and an upper and overlaying portion 32. Any paper upon which braille writing is to be effected passes between these two portions. The upper portion is typically hinged, as at 34, with respect to the lower portion to facilitate the installation of the paper between the two portions. These elements of the guide plate assembly can be fabricated from plastic or metal, for example.

The guide plate assembly 24 is provided with a plurality of braille character cells 36. These cells are arranged equally spaced along each row, with rows being equally spaced. Only a certain number of cells are shown in each row; however, it will be understood that these cells continue across the guide plate assembly as indicated by the dashed lines. While only five rows of cells are depicted, other numbers of rows can be used. The exact size and number of cells, and their spacing, will depend upon the specific use. Beginner braille writers, for example, need to have larger and higher embossing that are spaced farther apart than for "normal" writers. Further, the width (top to bottom) of the guide plate assembly is illustrated as being ¼ of the usable space of the board 12; however, the assembly 24 can be of a different width relative to the board, even can cover essentially all of the board. Also, the guide plate assembly 24 can be used separate from the board 12. If desired, the guide plate assembly can be provided with additional character cells as at 38 whereby page numbers can be affixed to the sheet of paper held between the layers of the guide plate assembly. Illustrated at 40 is the position where cells 36 would be located when the guide plate assembly of the size shown is moved down the glide member 20 so that aperture 28 is engaged with position-orienting element 22A. The guide plate assembly in this embodiment is provided with a cut-out 42 so that the guide plate assembly will not interact with the clip 18.

Figure 3:
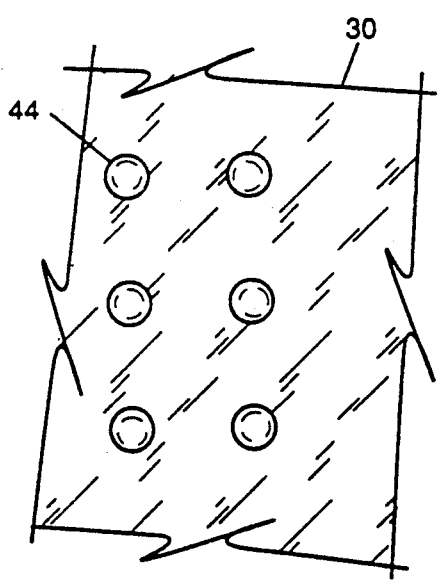
FIG. 3 is an enlarged plan view of a lower portion of a guide plate assembly, cut away, showing a six pin array of a single writing cell of the guide plate assembly of the present invention.
Figure 4:
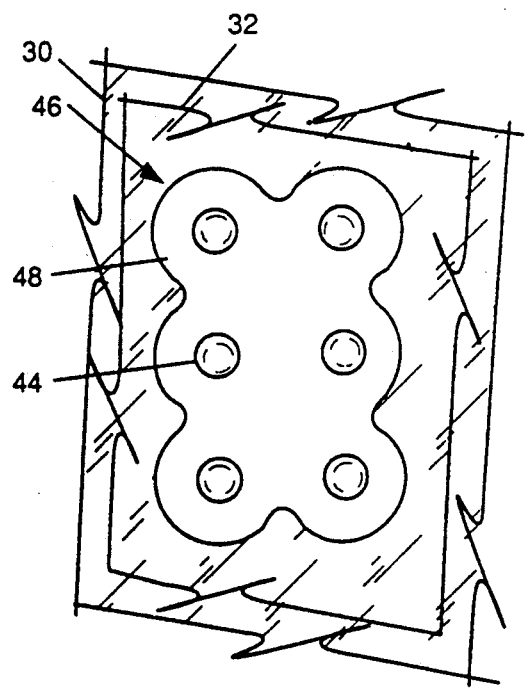
FIG. 4 is an enlarged plan view, cut away, of one writing cell of the guide plate assembly of the present invention as shown with a circle noted at 4 of FIG. 1.
Figure 10:
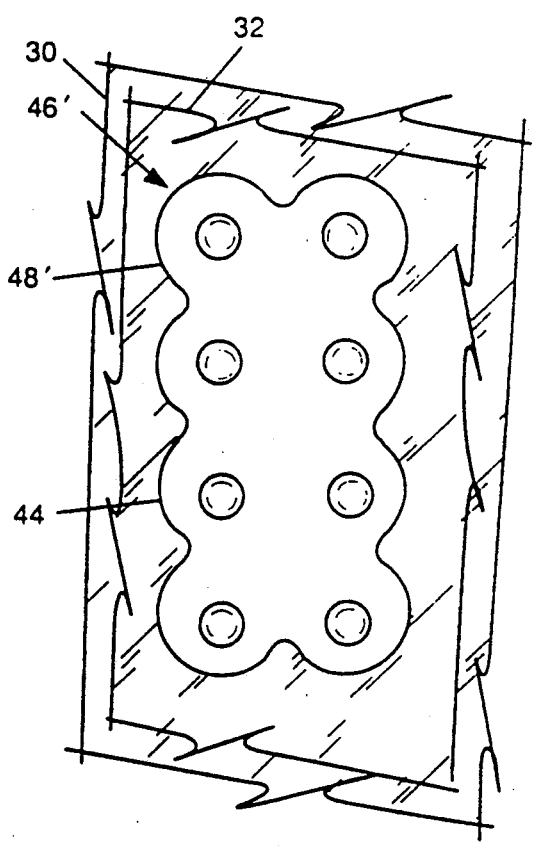
FIG. 10 illustrates a braille character cell construction wherein there are eight elements for the formation of braille dots as used in certain shorthand braille writing.

The construction of each character cell 36 (and 38) can be better understood by referring to FIGS. 3 and 4. Shown in FIG. 3, for example, is a typical array of six pins 44 (a two wide, three high matrix) that exist for each of these character cells. These pins extend upwardly from the lower portion 30 of the guide plate assembly. They are arranged in the conventional rectangular array normally used to produce braille dots in the paper. These pins are typically 0.032 inch in diameter, are typically separated 0.10 inch on centers, and are typically 0.016 inch high. Positioned in the upper portion 32 of the guide plate assembly at each cell is a rosette-shaped opening 46. Each generally circular portion 48 of this opening is formed to be concentric to one of the pins 44 as illustrated in FIG. 4. Typically the rosettes 48 each have a radius of 0.05 inch. The intersection between each rosette portions is typically rounded to a radius of 0.01 inch. As stated above, in Grade 3 braille, there can be an eight pin array in a braille character cell. This requires an opening formed of eight rosettes. Such a construction is illustrated in FIG. 10.

Figure 6:
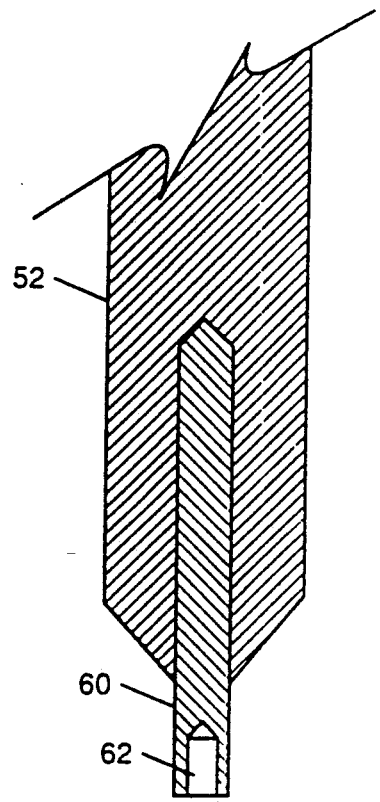
FIG. 6 is an enlarged partial cross-sectional view of the active end of the stylus of FIG. 5 taken at 6—6 thereon.
Figure 7:
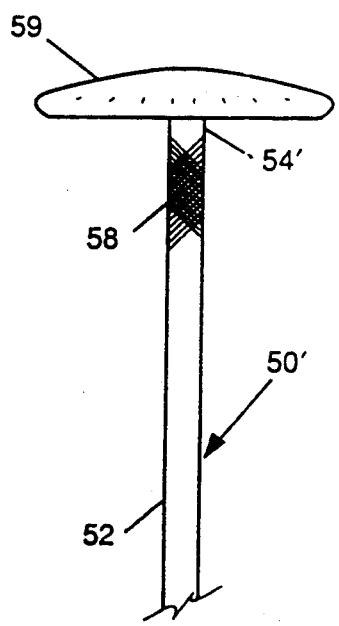
FIG. 7 is a partial side elevational view of another embodiment of a stylus for use with the present invention.

A stylus member 50, as shown in FIGS. 5 and 6, complements the tablet member 10 (FIGS. 1 and 2) of the present invention. This stylus has a generally elongated body 52 having an upper end 54 and a lower end 56. Typically the stylus 50 is provided with a lanyard 57 at the upper end 54 which can be attached to the clip board at 23. The exterior surface of the body, or at least a major portion thereof, can have a light knurl as indicated at 58 so as to enhance grasp by a user. Also, the stylus can have an enlarged knob 59 at the upper end as illustrated in FIG. 7. This body can be typically fabricated from plastic, aluminum, etc.

Mounted axially within the lower end of the body, and retained therein as by a friction fit, is a hardened cylindrical insert 60 fabricated from, for example, steel. This insert is provided with a cylindrical recess 62 in its exposed end, terminating in a substantially conical surface 63 the recess being typically 3/16 inch in diameter and 3/32 inch deep. These sizes are selected to be complementary to the pins 44. The outer diameter of the insert 60 is typically 3/32 inch to be complementary to the rosettes 48 of the character cell openings 46. The insert of the stylus, thus, can be inserted in an individual rosette so as to depress writing paper upon the pin associated with that rosette by the recess so as to make a braille marking. Additional dots can be made within a cell by engaging the recess with other of the pins of a given character cell 36.

There are applications of where braille is to be written on heavy writing stock. In order to achieve adequate pressure without undue pressure being applied by a user, a stylus can be constructed where there is a spring-biased "hammer" positioned within the stylus shaft. With this construction, when sufficient pressure is applied by a user, the hammer is released so as to provide inertial pressure against an insert having the necessary end recess to receive a pin so as to form the braille dot in the heavy writing stock.

Figure 8:
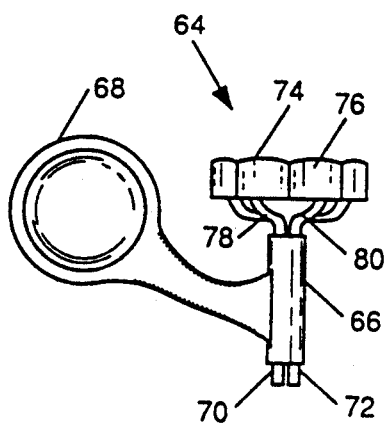
FIG. 8 is a side elevational view of a stylus assembly unit for use with the guide plate assembly of the present invention.
Figure 9:
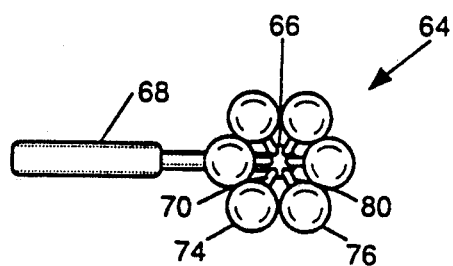
FIG. 9 is a top plan view of the stylus assembly of FIG. 8 illustrating the top arrangement of the stylus operators.

Some users of a braille writer may have difficulty in either holding the stylus illustrated in FIGS. 5 and 7 and/or positioning a stylus in individual rosette portions of a braille cell on the guide plate. Another stylus unit 64 to facilitate use of the braille writer and eliminate the problem is illustrated in the side elevational view of FIG. 8 and a top plan view of FIG. 9. This stylus assembly unit has a body 66 that can be cylindrical or rectangular in configuration, and a handle member 68 projects to one side. This handle member can have concave surfaces for better grasp by fingers (e.g., thumb and first finger) of a user. Passing axially through the body member 66 are a plurality of stylus members as at 70, 72 in FIG. 8. However, there is a stylus member to align with each of the pins of a braille character cell as can be seen in FIG. 9 (for a six-pin cell). Each stylus member is joined to a key member, as at 74, 76 with an off-set arm (stylus member extension) as at 78, 80 such that the keys are arranged around the body for operation by a finger of a user of the device. These key members can be of any convenient size, with the off-set arms sized in length to accommodate the chosen size. Also, the keys can be rectangular instead of round if desired. Furthermore, although all of the key members are illustrated as being in a common plane, they could be staggered in distance from the top of the body member if desired. When used, this stylus assembly is placed to fit all of the stylus members thereof each within a rosette of the opening for the braille character cell. While in this position, the appropriate keys are depressed causing those particular stylus members, with their end recesses, as in FIG. 6, to form braille dots by the combined function of the stylus members and the pins associated with the character cell.

A typical utilization of the present invention can be understood by referring again to FIGS. 1 and 2. With the guide plate assembly 24 raised to its uppermost position on the clip board 12 such that the aperture 28 engages one of the position-orienting units (like 22), the upper layer of the guide plate assembly is pivoted upwardly so that a sheet of paper can be placed between the layers of the guide plate assembly. This paper is oriented using the guide 17, and then is held in position using the clip 18. Thereafter, the stylus 50 (FIG. 5), 50' (FIG. 7) or stylus assembly 64 (FIG. 8) is utilized to depress the paper under the first character cell at the upper left to form any desired braille character. The stylus is then moved right to the next character cell where the process is repeated. Thus, writing is accomplished left-to-right in a normal manner. This is continued until any desired text is recorded via braille dots on the surface of the paper. In order to assist a user in locating character cells, identifying raised indicia 82, 84 can be applied to the surface of the upper portion 32 so as to mark the character cells in a row as well as the rows. When the number of rows have been used in the guide plate assembly, the guide plate assembly can be disengaged from the position-orienting units and moved to another location to engage another of these units wherein the braille writing can continue. Further, page numbers or other page indicia can be added using the character cells at 38.

If a user wishes to read what has been written, or if his/her location needs to be determined after an interruption in writing, the upper layer 32 of the guide plate assembly can be lifted for this purpose. Since the braille dots are on the upper surface of the paper, reading is accomplished from left-to-right in a normal manner. The exact location for continuing the writing is assured by the locking of the guide plate assembly with respect to the clip board.

From the foregoing it will be understood by persons skilled in the art that an inexpensive and practical manual braille writer has been provided by the present invention. This braille writer permits normal left-to-right writing as well as left-to-right reading. Further, provision is made for easy alignment for additional writing on a text that has already been begun, and a user can easily locate where to begin writing when interrupted.

Certain sizes and materials of construction have been used throughout this description. These are for a full description of the invention and are not for a limitation of the invention. Rather, the invention is to be limited only by the appended claims and their equivalents.

We claim:

1. A manual braille writer which permits natural left-to-right writing and reading, which comprises:
a guide plate assembly having an upper layer and a lower layer to embrace a sheet of writing material therebetween upon which braille writing is to be accomplished, said guide plate assembly provided with a plurality of text character cells for writing braille text spaced in rows and columns, with said rows spaced equally apart, and with a selected number of page identification character cells at a selected position of said guide plate assembly removed from said rows, each of said text and page identification character cells formed of a selected number of pins affixed to said lower layer in an array to produce braille dots on a top surface of said writing material and by openings in said upper layer having a multiple rosette-type configuration of a corresponding number of rosettes, said rosette-type configuration oriented over said array of pins, said upper layer of said guide plate assembly being provided with raised indicia adjacent at least one end of each row of said text character cells and with further raised indicia adjacent at least one end of each column of said character cells to facilitate position orientation by a user of said device; and stylus means for passing through said openings in said upper layer to apply pressure to at least one of said pins to form braille characters in said printing material, said stylus provided in a distal end with a cylindrical recess terminating in a substantially conical surface to receive said at least one of said pins.

2. The braille writer of claim 1 further comprising a base member having a top surface, a top edge, a bottom edge and opposite side edges, said base member supporting said guide plate assembly, said top surface having guides to orient said sheet of writing material.

3. The braille writer of claim 2 wherein said guide plate assembly has a dimension along said base member that is less than the dimension of the base member in a direction from said top edge to said bottom edge, and further comprises detent means for releasably fastening said guide plate assembly at various locations along one of said side edges of said base member.

4. The braille writer of claim 2 wherein said base member is provided with a clip means at said bottom edge to releasably hold said sheet of said writing material on said top surface of said base member.

5. The braille writer of claim 1 wherein said upper layer of said guide plate assembly is hinged with respect to said lower layer.

6. The braille writer of claim 1 wherein each of said character cells is formed of six pins affixed to said lower layer and said opening in said upper layer has six rosettes oriented over said pins.

7. The braille writer of claim 1 wherein said stylus means for passing through said opening is a stylus assembly, which comprises:

a body member having a longitudinal axis and a top and bottom end;

a handle member projecting outwardly from said body member for grasp by a user of said braille writer;

a plurality of stylus members passing axially through said body member and being slidable in said body member, each of said stylus members provided with said recess in a distal end extending from said bottom end of said body member to engage a pin of said lower layer of said guide plate, said stylus members being of sufficient number to exactly match said pins;

a stylus member extension at a further end of each of said stylus members, said stylus member extension positioned exterior said body member proximate said top end thereof and projecting outwardly and upwardly from said body member; and a key member attached to a free end of each of said stylus member extensions, said key members operable by said user of said braille writer whereby depression of a key produces a braille dot in said writing material.

8. The braille writer of claim 7 wherein said stylus assembly has six stylus members passing through said body member when said braille character cell has a six pin array on said lower layer of said guide plate assembly.

9. A manual braille writer which permits natural left-to-right writing and reading, which comprises:

a base member for generally supporting a sheet of writing material upon which braille writing is to be accomplished, said base member having a top surface, a top edge, a bottom edge and opposite side edges;

a guide plate assembly mounted over said top surface of said base member, said guide plate assembly having an upper layer and a lower layer to embrace said sheet of writing material therebetween, said upper layer pivotally mounted with respect to said lower layer, said guide plate assembly provided with a plurality of text character cells for writing text spaced in rows and columns, with said rows spaced equally apart, and with a selected number of page identification character cells at a selected position of said guide plate assembly removed from said rows, each of said text and page identification character cells formed of six pins affixed to said lower layer in an array to produce braille dots on a top surface of said writing material and by openings in said upper layer having a multiple rosette-type configuration of six rosettes, said rosette-type configuration oriented over said array of pins, said upper layer of said guide plate assembly being provided with raised indicia adjacent at least one end of each row of said text character cells and with further raised indicia adjacent at least one end of each column of said text character cells to facilitate position orientation by a user of said device; and a stylus provided with a distal end of a diameter to be closely received within any one of said six rosettes in said upper layer of said guide plate assembly, said distal end provided with a cylindrical recess, which terminates in a substantially conical surface, of a size to receive one of said pins of said lower layer of said guide plate assembly whereby said writing material between said upper and lower layers of said guide plate assembly is deformed by said pin and said recess so as to produce a braille dot on said upper surface of said writing material.

10. The braille writer of claim 9 wherein said guide plate assembly has a dimension along said base member that is less than the dimension of the base member in a direction from said top edge to said bottom edge, and further comprises detent means for releasably fastening said guide plate assembly at various locations along one of said side edges of said base member.

11. The braille writer of claim 9 wherein said base member is provided with a clip means at said bottom edge to releasably hold a sheet of said writing material on said top surface of said base member.

12. The braille writer of claim 9 wherein said base member is provided with:

a clip means for releasably holding said stylus when not in use by a user of said braille writer; and attachment means for a flexible lanyard for attaching said stylus to said base member.

13. A manual braille writer which permits natural left-to-right writing and reading, which comprises:

a base member for generally supporting a sheet of writing material upon which braille writing is to be accomplished, said base member having a top surface, a top edge, a bottom edge and opposite side edges, said base member provided with guides on said top surface to orient said sheet of writing material and with a clip member proximate said bottom edge to releasably hold said sheet of writing material on said top surface;

a guide plate assembly mounted over said top surface of said base member, said guide plate assembly having an upper layer and a lower layer to embrace said sheet of writing material therebetween, said upper layer pivotally mounted with respect to said lower layer to facilitate insertion of said sheet of writing material, said guide plate assembly provided with a plurality of text character cells for writing braille text spaced in rows and columns, with said rows spaced equally apart, and with a selected number of page identification character cells at a selected position of said guide plate assembly removed from said rows, each of said text and page identification character cells formed of a selected number of pins affixed to said lower layer in an array to produce braille dots on a top surface of said writing material and by openings in said upper layer having a multiple rosette-type configuration of a corresponding number of rosettes, said rosette-type configuration oriented over said array of pins, said guide plate assembly having a dimension along said base member that is less than the dimension of the base member in a direction from said top edge to said bottom edge, said upper layer of said guide plate assembly being provided with raised indicia adjacent at least one end of each row of said text character cells and with further raised indicia adjacent at least one end of each column of said text character cells to facilitate orientation by a user of said device;

detent means for releasably fastening said guide plate assembly at various selected locations along one of said side edges of said base member; and a stylus means provided with a distal end for passing through said openings in said upper layer of said guide plate assembly, said distal end provided with a cylindrical recess, terminating in a substantially conical surface, of a size to receive one of said pins of said lower layer of said guide plate assembly whereby said writing material between said upper and lower layers of said guide plate assembly is deformed by said pin and said recess so as to produce said braille dot on said top surface of said writing material.

14. The braille writer of claim 13 wherein each of said character cells is formed of six pins affixed to said lower layer and said opening in said upper layer has six rosettes oriented over said pins.

15. The braille writer of claim 13 wherein said stylus means for passing through said opening is a stylus assembly, which comprises:

a body member having a longitudinal axis and a top and bottom end;

a handle member projecting outwardly from said body member for grasp by a user of said braille writer;

a plurality of stylus members passing axially through said body member and being slidable in said body member, each of said stylus members provided with a recess in a distal end extending from said bottom end of said body member to engage a pin of said lower layer of said guide plate, said stylus members being of sufficient number to exactly match said pins;

a stylus member extension at a further end of each of said stylus members, said stylus member extension positioned exterior said body member proximate said top end thereof and projecting outwardly and upwardly from said body member; and a key member attached to a free end of each of said stylus member extensions, said key members operable by said user of said braille writer whereby depression of a key produces a braille dot in said writing material.

16. A manual braille writer which permits natural left-to-right writing and reading, which comprises:

a guide plate assembly having an upper layer and a lower layer to embrace a sheet of writing material therebetween upon which braille writing is to be accomplished, said guide plate assembly provided with a plurality of character cells for writing text spaced equally along rows, with said rows spaced equally apart, each of said character cells formed of a selected number of pins affixed to said lower layer in an array to produce braille dots on a top surface of said writing material and by openings in said upper layer having a multiple rosette-type configuration of a number of rosettes corresponding to said number of pins, said rosette-type configuration oriented over said array of pins; and stylus means for passing through said openings in said upper layer to apply pressure to at least one of said pins to form braille characters in said writing material, said stylus means comprising a) a body member having a longitudinal axis and a top and bottom end, b) a handle member projecting outwardly from said body member for grasping by a user of said braille writer, c) a plurality of stylus members passing axially through and being slidable in said body member, each of said stylus member provided with a recess in a distal end extending from said bottom end of said body member to engage a pin of said lower layer of said guide plate, said stylus members being of sufficient number to exactly match said number of pins, d) a stylus member extension at a further end of each of said stylus members, said stylus member extension positioned exterior said body member proximate said top end thereof and projecting outwardly and upwardly from said body member, and e) a key member attached to a free end of each of said stylus member extensions, each said key member operable by said user whereby depression of a key member produces a braille dot on said writing material.

* * * * *